United States Patent [19]
Narayanaswamy et al.

[11] Patent Number: 6,144,358
[45] Date of Patent: Nov. 7, 2000

[54] MULTI-DISPLAY ELECTRONIC DEVICES HAVING OPEN AND CLOSED CONFIGURATIONS

[75] Inventors: Shankar Narayanaswamy, Sunnyvale, Calif.; Eugene J. Rosenthal, Edison, N.J.

[73] Assignee: Lucent Technologies Inc., Murray Hill, N.J.

[21] Appl. No.: 08/915,816

[22] Filed: Aug. 20, 1997

[51] Int. Cl.⁷ .................................................... G09G 3/36
[52] U.S. Cl. ............................. 345/102; 345/173; 345/5; 349/61
[58] Field of Search .............................. 345/1, 4, 5, 156, 345/173, 102, 104; 349/61

[56] References Cited

U.S. PATENT DOCUMENTS

| | | | |
|---|---|---|---|
| 4,965,559 | 10/1990 | Dye | 345/1 |
| 5,049,862 | 9/1991 | Dao et al. | 345/179 |
| 5,467,102 | 11/1995 | Kuno et al. | |
| 5,584,054 | 12/1996 | Tyneski et al. | 455/89 |
| 5,646,649 | 7/1997 | Iwata et al. | 345/173 |
| 5,847,698 | 12/1998 | Reavey et al. | 345/173 |
| 5,856,819 | 1/1999 | Vossler | 345/102 |
| 5,914,706 | 6/1999 | Kono | 345/173 |
| 5,949,643 | 9/1999 | Batio | 361/681 |
| 5,995,085 | 11/1999 | Bowen | 345/173 |

FOREIGN PATENT DOCUMENTS

| | | |
|---|---|---|
| 195 46 786 A1 | 6/1997 | Germany. |
| 2 260 844 | 4/1993 | United Kingdom. |

OTHER PUBLICATIONS

"Internet Search Results", Apr. 3, 1997, 20 pages.
"How to Take in Twice as Much Information?", vol. 102, No. 1723, Jun. 1, 1996, p. 452.

*Primary Examiner*—Dennis-Doon Chow
*Assistant Examiner*—Amr Awad
*Attorney, Agent, or Firm*—Steve Mendelsohn

[57] ABSTRACT

A portable or other electronic device has two or more display devices or screens that can be used to display different subsets of image signals. The effect is that the device simulates the display capabilities of devices having much larger screens. The device has an open or active configuration, in which the multiple screens are available for displaying image signals, and a closed or inactive configuration, in which some or all of the multiple screens are folded together or otherwise stowed away to reduce the size of the device for storage and/or carrying. By simulating large-display operations, electronic devices according to the present invention are capable of presenting more useable information to the user than is otherwise possible using prior art devices having a single small screen.

11 Claims, 4 Drawing Sheets

MULTI-DISPLAY ELECTRONIC DEVICES HAVING OPEN AND CLOSED CONFIGURATIONS

BACKGROUND OF THE INVENTION

1. Field of the Invention

The present invention relates to portable and other electronic devices having displays, such as monitors or screens, for the display of text, graphics, and/or video images.

2. Description of the Related Art

One of the drawbacks to portable electronic devices, such as personal digital assistants, cellular telephones, internet access devices, palmtop computers, and even some laptop computers, is that the displays are of limited size. These small displays limit the type of applications that can be run effectively on such devices and/or detract from the quality of the images displayed by such applications. For example, it may be impractical to run software that relies on a graphical user interface (GUI) on a portable device, because the elements of the GUI on the small screen of the portable device will be too small to be adequately visible.

SUMMARY OF THE INVENTION

The present invention is directed to a portable or other electronic device having two or more display devices or screens that can be used to display different subsets of image signals. The effect is that the device simulates the display capabilities of devices having much larger screens. The device has (1) an open or active configuration in which each display device is deployed for displaying a different subset of the image signals and (2) a closed or inactive configuration in which one or more of the display devices are stowed away and unavailable for displaying image signals. Stowing the display devices away, which reduces the size, e.g., footprint, of the device for storage and/or carrying, means folding them together or otherwise making one or more of them unavailable to display image signals for viewing by the user. By simulating large-display operations, electronic devices according to the present invention are capable of presenting more useable information to the user than is otherwise possible using prior art devices having a single small screen.

BRIEF DESCRIPTION OF THE DRAWINGS

FIG. 1(*c*) shows a perspective view of a portable electronic device in the open configuration, according to an alternative embodiment of the present invention;

DETAILED DESCRIPTION

The present invention is directed to portable and other electronic devices that have two or more display devices, e.g., screens, where each display device is adapted to display different subsets of image signals generated by an image generator and distributed to the display devices by one or more display drivers. The electronic devices have a closed configuration in which one or more of the displays are, for example, stowed away, e.g., folded together, to facilitate the portability and/or storage of the electronic device.

A display driver is a component that provides an interface between an image generator and a display device, whereby the display driver receives image signals or image generation commands from the image generator and, if necessary, processes those signals/commands to generate the signals for display by the display device. This processing may include such image processing functions as color format transformations and image scaling. A display driver may be implemented in any suitable combination of hardware and software.

Figure 1A:
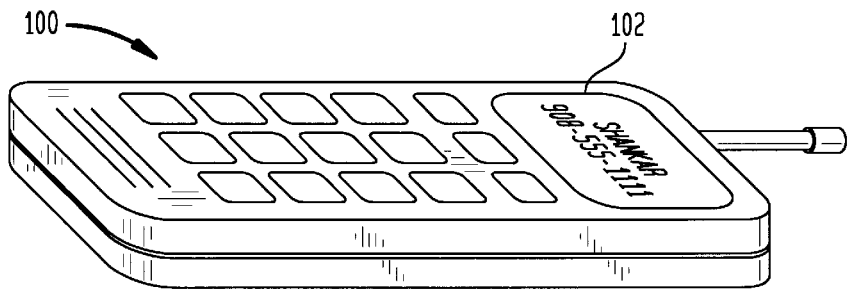
FIGS. 1(*a*) and 1(*b*) show perspective views of a portable electronic device that functions as a combined cellular phone/personal digital assistant, according to one embodiment of the present invention.
Figure 1B:
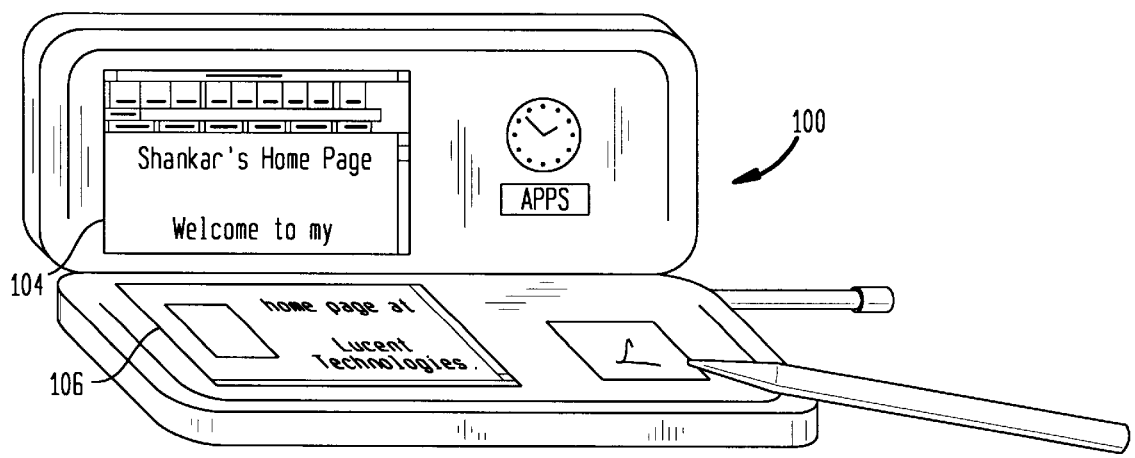
Figure 1C:
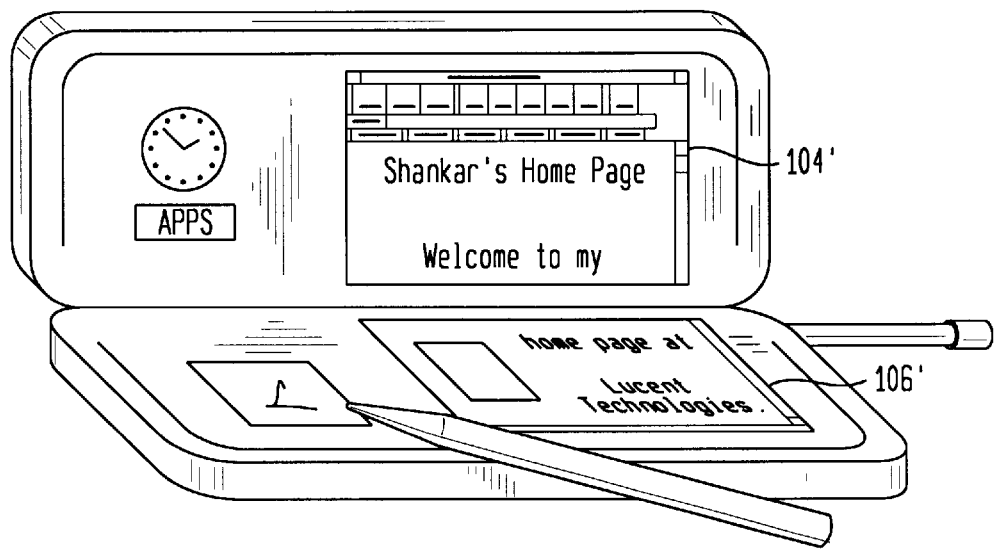

FIGS. 1(*a*) and 1(*b*) show perspective views of a portable electronic device 100 that functions as a combined cellular phone/personal digital assistant, according to one embodiment of the present invention. FIG. 1(*a*) shows device 100 in its closed configuration, while FIG. 1(*b*) shows device 100 in a partially open configuration.

Device 100 has three distinct displays 102, 104, and 106. Display 102 displays images when device 100 is in its closed configuration in which device 100 operates as a cellular phone. In this configuration, display 102 is able to display conventional text and/or graphical images associated with sending and receiving telephone calls using a cellular phone.

Displays 104 and 106 display images when device 100 is in its open configuration in which device 100 operates as a personal digital assistant (PDA). According to one embodiment of the present invention, each of displays 104 and 106 displays part, e.g., half, of each PDA image. In the open configuration, displays 104 and 106 are positioned next to each other and display drivers in device 100 divide images for display on the two displays. The image thus displayed overflows from one display to the other, giving the appearance of a single large display displaying the full image. The multiple small displays combine to simulate the operations of a single large display. As such, device 100 is able to present concurrently more useable information to the user than would otherwise be available to a user of a conventional PDA that had a single small display.

Displays 104 and 106 may be any suitable type of display device, including liquid crystal displays (LCDs). In device 100, a hinge or other similar mechanism may be used to keep the displays together when used in the open, e.g., active, configuration or the closed, e.g., inactive, configuration. A locking mechanism can be used to keep the combined structure rigid when the screens are unfolded. As shown in FIG. 1(*b*), the different displays need not be co-planar in order for the device to be used in the active configuration.

Device 100 has two flat-panel displays 104 and 106 which may be less than 5 mm thick without a backlight. When the device is in its inactive configuration, the two sides are folded together. For example, if a 5"×5" display area is implemented using two 5"×2.5" displays, the two displays are stored flat against each other. The inactive area is therefore only half of the active area, resulting in a more compact configuration for carrying and/or storing the device.

FIG. 1(*c*) shows a perspective view of a portable electronic device in the open configuration, according to an alternative embodiment of the present invention. According to this embodiment, display 102 of FIG. 1(*a*) and display 104' of FIG. 1(*c*) are positioned back-to-back within the top half of the device. In one implementation of this embodiment, the device has backlighting means located behind display 106', and displays 106' and 104' are transparent. For such an implementation, the backlighting means behind display 106' will illuminate display 102 when the device is in the closed configuration as shown in FIG. 1(*a*). In this way, a thinner device with backlighting can be achieved. Furthermore, in certain embodiments, display 102 of FIG. 1(*a*) and display 104' of FIG. 1(*c*) may be implemented as a single display device that is adapted to generate images for both the open and closed configurations and possibly at the same time.

Figure 2:
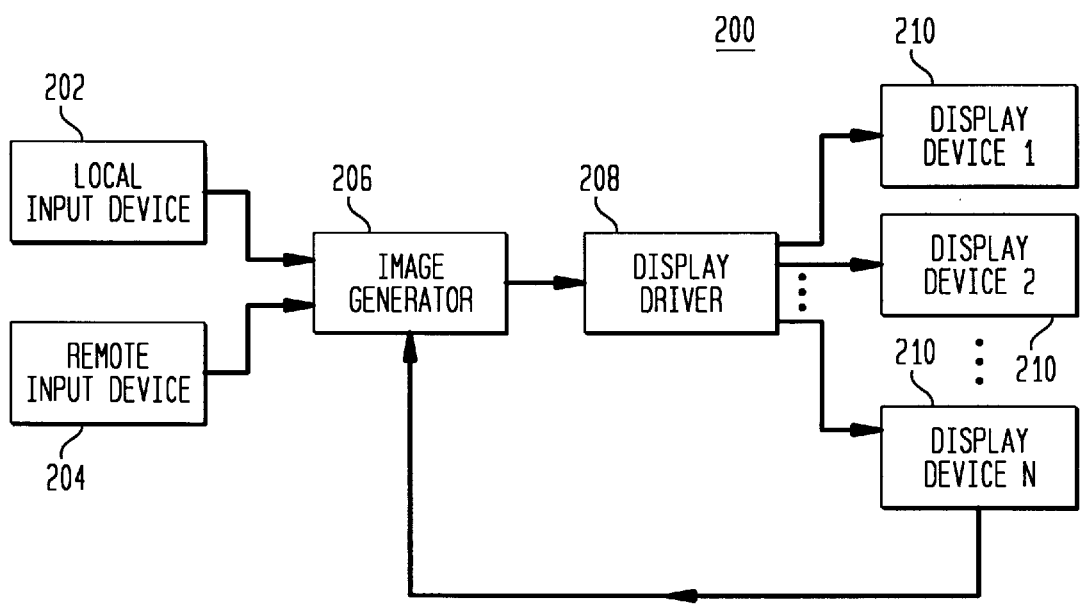
FIG. 2 shows a block diagram of an electronic device, according to one implementation of the present invention.

FIG. 2 shows a block diagram of an electronic device 200, according to one implementation of the present invention. For example, electronic device 200 may be modified as needed to implement device 100 of FIGS. 1 (*a*)–(*b*). Device 200 has two or more display devices that may be used to display different sets of image signals to create the effect of a larger display.

In particular, image generator 206 generates image signals for display on display devices 210. The image signals may comprise any conventional type of image signals, including text, video, graphics, or any combination thereof. Display driver 208 receives the image signals from image generator 206 and distributes appropriate subsets of image signals to the various display devices 210 for display. Each display device 210 operates as a distinct image display device. The effect however of all of the display devices 210 operating together under the control of display driver 208 is the simulation of a larger display device displaying all of the image signals generated by image generator 206. Image generator 206 and display driver 208 may be implemented on a single processor, either in hardware, in software, or in a combination of both hardware and software.

Electronic device 200 also has optional local input device 202 and optional remote input device 204. Local input device 202 may be any suitable device that enables a user to enter information into device 200, such as a keyboard, a keypad, a stylus for a touch screen, a thumb wheel for scrolling, or a track pad. This information is received by image generator 206 for appropriate updating of the image signals to be displayed. Remote input device 204 may be an antenna, network, or cable port, or other suitable type of interface for receiving information from a remote source. This information is also received by image generator 206 for the update of the images to be displayed. In particular implementations, one or more of the display devices may be touch sensitive to operate as additional input devices of device 200 for the input of user-selected information to be fed back to image generator 206.

Figure 3:
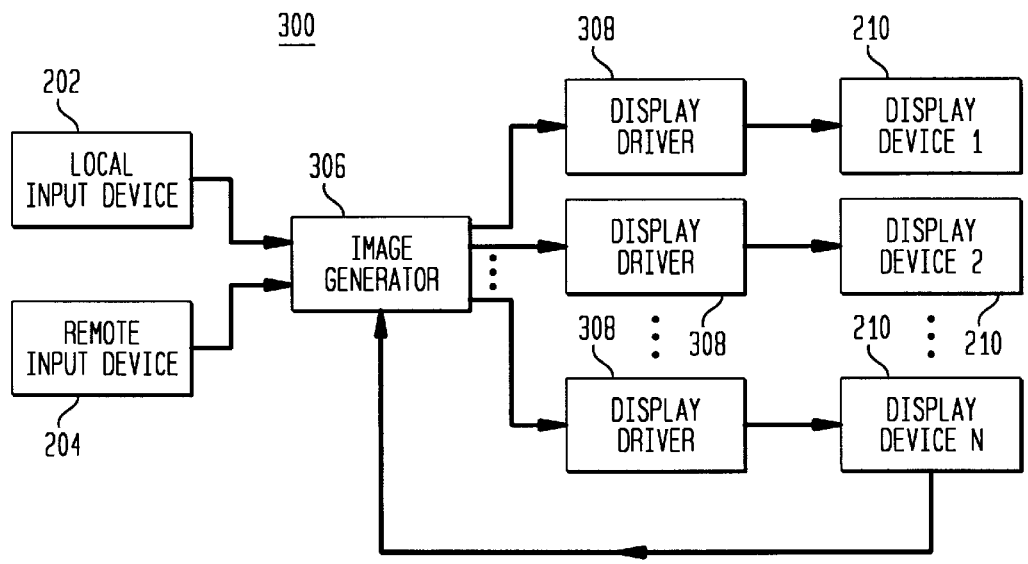
FIG. 3 shows a block diagram of an electronic device 300, according to an alternative implementation of the present invention.

FIG. 3 shows a block diagram of an electronic device 300, according to an alternative implementation of the present invention. Electronic device 300 is analogous to electronic device 200 of FIG. 2, except that each display device 210 in device 300 has its own display driver 308 to control the display of subsets of image signals. Image generator 306 and display drivers 308 may be implemented on a single processor, either in hardware, in software, or in a combination of both hardware and software.

Depending on the implementation, the function of dividing image signals into subsets for display on the various display devices may be performed by either the image generator or the one or more display drivers. Even in device 300 of FIG. 3, where each display driver 308 interfaces with only a single display device, image generator 306 could generate and store the image signals into memory, and each display driver 308 could know which subset of those image signals to retrieve from memory. In any case, the image signals are divided into subsets based on the portions of each image displayed by the various display devices. For example, in the embodiment of FIG. 4, where the display devices display the top and bottom halves of each image, respectively, the image signals are divided into two subsets accordingly. Similarly, in the embodiment of FIG. 6, where the display devices display the top half, lower left quarter, and lower right quarter of each image, respectively, the image signals are divided into three subsets accordingly.

Figure 4:
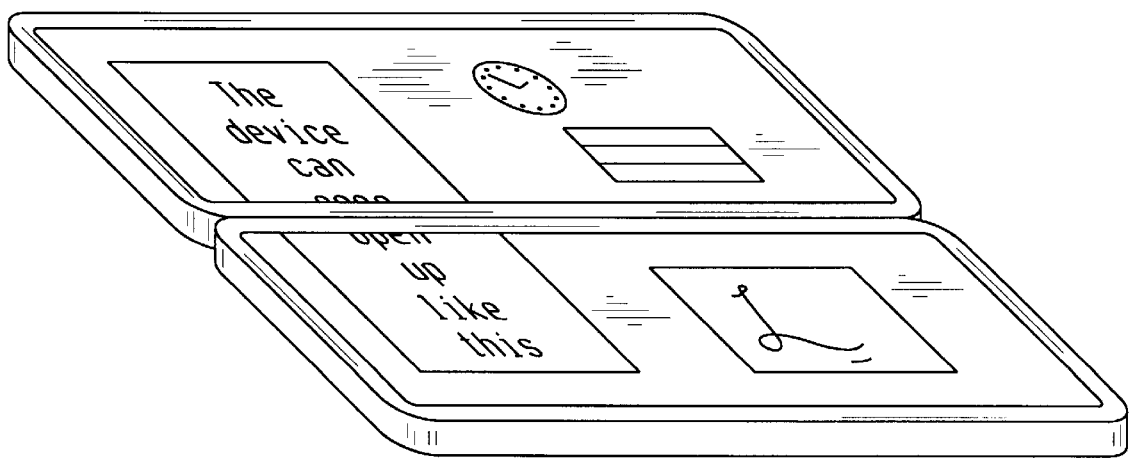
FIGS. 4–6 shows portable electronic devices, according to possible embodiments of the present invention.
Figure 5:
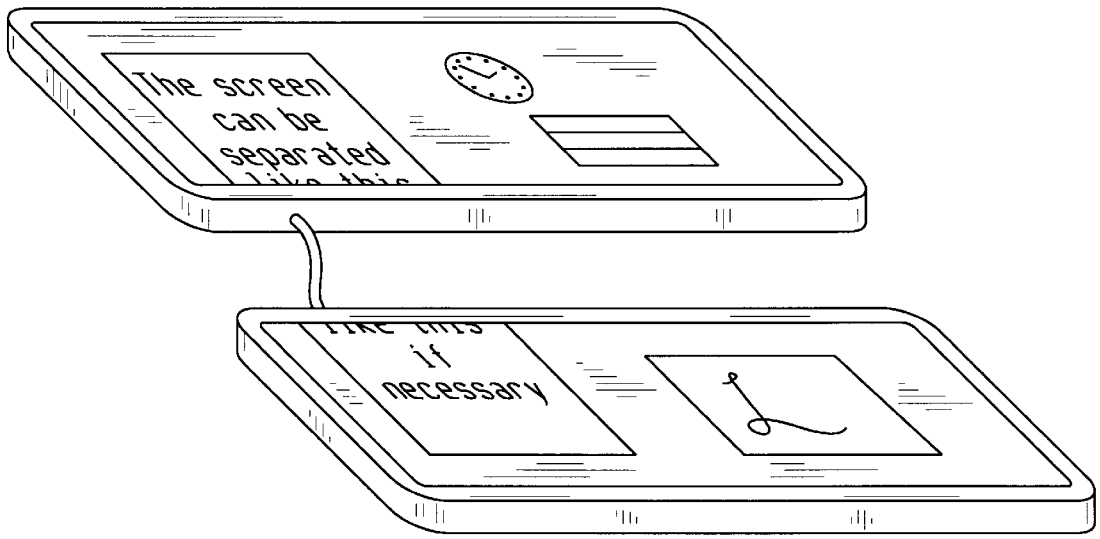
Figure 6:
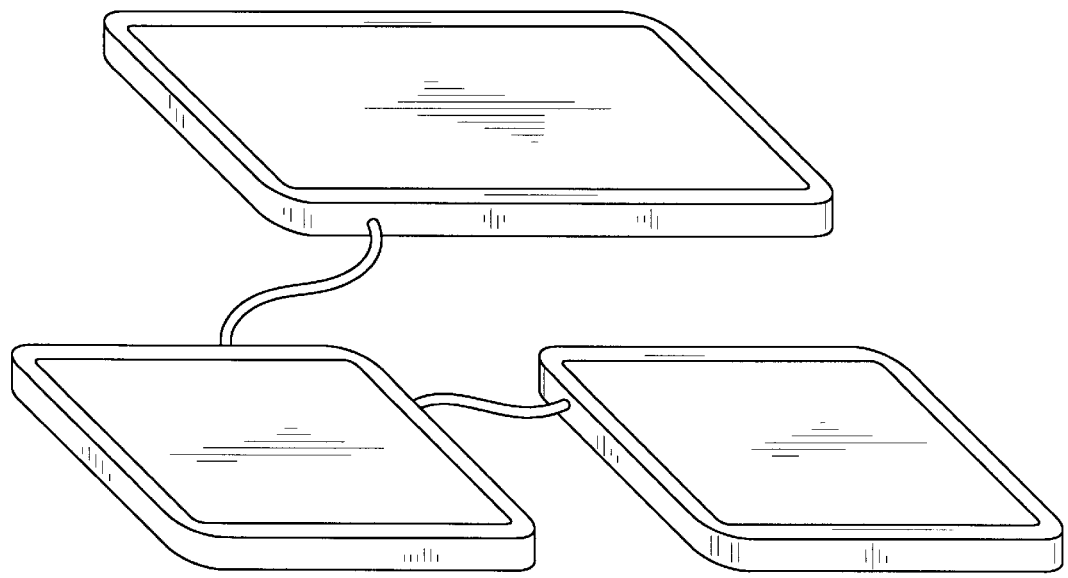

FIGS. 4–6 shows portable electronic devices, according to possible embodiments of the present invention. In FIG. 4, the portable electronic device has two displays that are shown in the full open configuration. In FIG. 5, the portable electronic device is shown configured with its two displays separated.

In FIG. 6, the portable electronic device has three separable displays. As mentioned above, in some implementations of the present invention, one or more of the display devices may operate as touch-type input devices. In these implementations, parts of one or more of the display devices could be used as a soft keyboard in which a keyboard is displayed on the screen and the user "types" by touching the screen at the appropriate locations. The touch membrane detects the locations where the user types and infers which characters are being typed. In one embodiment of the present invention, one of the multiple display devices may be a touch-type device that provides the soft keyboard. In an alternative embodiment, two such display devices may be used: one providing the left-hand portion of the soft keyboard and the other providing the right-hand portion of the soft keyboard. These display devices may be able to be positioned in different orientations, as selected by the user. Moreover, the display devices may be able to be physically separated from one another, as shown in FIG. 6. For example, in the application as a soft keyboard, the left- and right-hand touch screens may be separated to suit the user's ergonomic preferences. These touch screens may be stowed away when the electronic device is in the closed configuration.

In some embodiments of the present invention, the electronic devices support an alternative mode of operation in which two or more of the multiple displays can operate as distinct displays that display different images rather than different parts of the same images.

Although the present invention is particularly suitable for portable electronic devices, such as personal digital assistants, cellular telephones, internet access devices, palm-top computers, and laptop computers, those skilled in the art will understand that the present invention may be applied to other types of electronic devices as well, including stationary computer terminals.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An electronic device comprising:

(a) an image generator adapted to generate image signals;

(b) one or more display drivers, connected to the image generator and adapted to receive the image signals from the image generator; and (c) at least three distinct display devices, connected to the one or more display drivers, wherein the electronic device has (1) an open configuration in which first and second display devices are deployed for displaying different subsets of the image signals and (2) a closed configuration in which a third display device is deployed for displaying image signals and the first and second display devices are stowed away and unavailable for displaying image signals, wherein the first and third display devices are mounted back-to-back with a single backlighting device located between the first and third display devices to illuminate (a) the third display device when the electronic device is in the closed configuration and (b) the first display device when the electronic device is in the open configuration.

2. The invention of claim 1, wherein the electronic device is a portable electronic device.

3. The invention of claim 1, wherein the display devices comprise a first touch-type display device adapted to display a left-hand side of a soft keyboard and a second touch-type display device adapted to display a right-hand side of the soft keyboard.

4. The invention of claim 3, wherein the first touch-type display device is separable from the second touch-type display device to allow the user to select relative positions for the left- and right-hand sides of the soft keyboard.

5. The invention of claim 1, comprising one display driver for all of the display devices.

6. The invention of claim 1, comprising one display driver for each display device.

7. The invention of claim 1, wherein the image generator and the one or more display drivers are implemented on a single processor.

8. The invention of claim 1, wherein the one or more display drivers are implemented in software.

9. The invention of claim 1, wherein the one or more display drivers are implemented in hardware.

10. An electronic device comprising first, second, and third displays, wherein the first and third displays are mounted back-to-back, such that:

when the device is in a closed configuration, the third display is visible to a user and the first and second displaysare hidden from view; and when the device is in an open configuration, the first and second displays are visible to the user and display different subsets of image signals; and further comprising a backlighting device located behind the first display to illuminate the first display when the device is in the open configuration, such that, when the device is in the closed configuration, the backlighting means illuminates the third display.

11. The invention of claim 10, wherein:

when the device is in the open configuration, the device is adapted to operate as a personal digital assistant; and when the device is in the closed configuration, the device is adapted to operate as a portable telephone.

* * * * *